United States Patent
Cho et al.

(10) Patent No.: US 12,407,023 B1
(45) Date of Patent: Sep. 2, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Yoon Gyo Cho, Daejeon (KR); Chul Haeng Lee, Daejeon (KR); Kyung Mi Lee, Daejeon (KR); Jung Min Lee, Daejeon (KR); Su Hyeon Ji, Daejeon (KR); Chul Eun Yeom, Daejeon (KR); Jung Gu Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/994,756

(22) PCT Filed: Jul. 11, 2023

(86) PCT No.: PCT/KR2023/009821
§ 371 (c)(1),
(2) Date: Jan. 15, 2025

(87) PCT Pub. No.: WO2024/019393
PCT Pub. Date: Jan. 25, 2024

(30) Foreign Application Priority Data

Jul. 19, 2022 (KR) .................. 10-2022-0089164

(51) Int. Cl.
| | | |
|---|---|---|
| H01M 10/0567 | (2010.01) | |
| H01M 4/38 | (2006.01) | |
| H01M 4/525 | (2010.01) | |
| H01M 4/583 | (2010.01) | |
| H01M 10/052 | (2010.01) | |
| H01M 10/0568 | (2010.01) | |
| H01M 10/0569 | (2010.01) | |
| H01M 4/02 | (2006.01) | |

(52) U.S. Cl.
CPC ....... *H01M 10/0567* (2013.01); *H01M 4/386* (2013.01); *H01M 4/525* (2013.01); *H01M 4/583* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2300/0034* (2013.01); *H01M 2300/0037* (2013.01)

(58) Field of Classification Search
CPC .. H01M 10/0567; H01M 4/386; H01M 4/525; H01M 4/583; H01M 10/052; H01M 10/0568; H01M 10/0569; H01M 2004/027; H01M 2004/028; H01M 2300/0034; H01M 2300/0037
See application file for complete search history.

(56) References Cited

U.S. PATENT DOCUMENTS

| | | |
|---|---|---|
| 9,362,599 B2 | 6/2016 | Amine et al. |
| 2014/0023941 A1 | 1/2014 | Amine et al. |
| 2019/0334207 A1 | 10/2019 | Yu et al. |
| 2020/0127330 A1 | 4/2020 | Yi et al. |
| 2020/0388880 A1 | 12/2020 | Ji et al. |
| 2022/0328873 A1 | 10/2022 | Cui et al. |

FOREIGN PATENT DOCUMENTS

| | | |
|---|---|---|
| CN | 111082134 B | 6/2021 |
| JP | H08-037024 A | 2/1996 |
| JP | 2000195545 A | 7/2000 |
| JP | 2000-260468 A | 9/2000 |
| JP | 2007141494 A | 6/2007 |
| JP | 2013-0079126 A | 5/2013 |
| JP | 2019-530959 A | 10/2019 |
| KR | 2013-0079126 A | 7/2013 |
| KR | 2016-0063188 A | 6/2016 |
| KR | 101797273 B1 | 11/2017 |
| KR | 2018-0023568 A | 3/2018 |
| KR | 2018-0086601 A | 8/2018 |
| KR | 10-2103898 B1 | 4/2020 |
| KR | 102619182 B1 | 12/2023 |

OTHER PUBLICATIONS

Notice of Allowance for Korean Application No. 10-2022-0089164 issued Dec. 15, 2023. 3 pgs.
International Search Report for Application No. PCT/KR2023/009821 mailed Oct. 17, 2023. 3 pgs.

*Primary Examiner* — Cynthia K Walls
(74) *Attorney, Agent, or Firm* — Lerner David LLP

(57) ABSTRACT

A non-aqueous electrolyte solution for a lithium secondary battery and a lithium secondary battery comprising the same are provided. The non-aqueous electrolyte solution for a lithium secondary battery of the present disclosure includes a lithium salt, an organic solvent and a compound represented by Formula 1 as a first additive, thereby improving the high-temperature storage characteristics of the secondary battery:

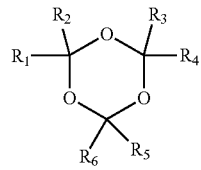

[Formula 1]

wherein all the variables are described herein.

16 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national stage entry under 35 U.S.C. § 371 of International Application No. PCT/KR2023/009821 filed on Jul. 11, 2023, which claims priority from Korean Patent Application No. 10-2022-0089164, filed on Jul. 19, 2022, all the disclosures of which are incorporated herein by reference in their entireties.

TECHNICAL FIELD

The present disclosure relates to a non-aqueous electrolyte solution for a lithium secondary battery and a lithium secondary battery including the same.

BACKGROUND ART

As dependence on electric energy is increasing in modern society, development of a large-capacity power storage device that can stably supply power and increase production is in the spotlight.

Lithium-ion batteries are a power storage device with the highest energy density that has been commercialized among power storage devices, and thus has been applied to various fields such as small electronic products, electric vehicles (EV) and power storage devices. In particular, high output characteristics are required for lithium ion batteries applied to electric vehicles, while maintaining the cycle characteristics and performance in various environments.

In order to improve the energy density of such a lithium secondary battery, research is being actively conducted to develop positive electrode active materials and negative electrode active materials having a high theoretical capacity.

On the other hand, research is being in progress to apply Si or SiOx (0<x<2), which has a high theoretical capacity compared to graphite currently used in commercially available batteries, as a negative electrode active material.

However, in the case of silicon-based negative electrode active materials, rapid volume changes and expansion occur due to changes in the crystal structure according to the intercalation and deintercalation of lithium ions during repeated electrochemical charging and discharging or storage at high temperatures, thereby resulting in cracking and degradation of the film, which intensifies battery deterioration. In particular, an SEI formed by the decomposition of a carbonate-based non-aqueous solvent causes side reactions with the electrolyte solution due to its high solubility for the electrolyte solution, and makes it difficult to maintain the film when the volume of the negative electrode expands due to its weak elasticity, thereby causing battery deterioration.

Accordingly, there is a demand for research and development to form a stable SEI that can withstand the change in the Si volume on the surface of the negative electrode when applying silicon-based negative active materials to solve the problem of deterioration due to the volume expansion of the silicon-based negative electrode active materials.

Technical Problem

The present disclosure aims to provide a non-aqueous electrolyte solution for a lithium secondary battery comprising an additive capable of forming a robust film on the surface of a silicon-based negative electrode.

Also, the present disclosure aims to provide a lithium secondary battery with enhanced high-temperature storage characteristics and high-temperature cycle characteristics by comprising the non-aqueous electrolyte solution for a lithium secondary battery.

Technical Solution

In order to achieve the above object, in one embodiment of the present disclosure, it provides a non-aqueous electrolyte solution for a lithium secondary battery comprising a lithium salt, a non-aqueous organic solvent and a first additive, wherein a compound represented by the following Formula 1 is included as the first additive:

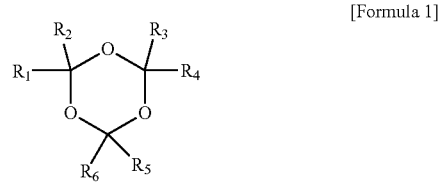

[Formula 1]

In Formula 1,
$R_1$ to $R_6$ are each independently hydrogen, an alkyl group having 1 to 5 carbon atoms, or —(R')n-C≡CH, R' is an alkylene group having 1 to 5 carbon atoms, n is an integer of 0 to 3, and at least one of $R_1$ to $R_6$ is —(R')n-C≡CH.

According to another aspect of the present disclosure, there is provided a lithium secondary battery including: a positive electrode including a positive electrode active material; a negative electrode including a negative electrode active material; a separator disposed between the negative electrode and the positive electrode; and the non-aqueous electrolyte solution for a lithium secondary battery.

The negative electrode may include a silicon-based negative electrode active material.

Advantageous Effects

The non-aqueous electrolyte solution of the present disclosure comprises a compound including a propargyl group capable of forming a robust SEI on the surface of the electrode and a trioxane functional group with excellent elasticity and lithium ion transportability as an additive, which enables to improve the durability of the silicon-based negative electrode active material against volume changes by forming a robust film based on a polyoxymethylene (POM) structure and a polymeric ether group.

If the non-aqueous electrolyte solution of the present disclosure is applied, a lithium secondary battery having improved cycle characteristics and high-temperature storage stability may be achieved.

DETAILED DESCRIPTION

Hereinafter, the present disclosure will be described in more detail.

The terms used herein are used only to describe exemplary embodiments, and are not intended to limit the present disclosure. Singular forms are intended to include plural forms as well, unless the context clearly indicates otherwise.

For example, it should be appreciated that the terms such as "including", "comprising", or "having" as used herein are intended to embody specific features, numbers, steps, elements, and/or combinations thereof, and to allow other components to be added unless the terms are used with the term "only."

Also in the present specification, the expression "%" denotes wt % unless explicitly stated otherwise.

Also, unless otherwise defined in the specification, the expression "substitution" denotes that at least one hydrogen bonded to carbon is substituted with an element other than hydrogen, for example, an alkyl group having 1 to 5 carbon atoms or a fluorine element.

The silicon-based negative electrode active material among negative electrode materials for conventional lithium ion batteries have the advantage of having excellent capacity per weight, but lithium ions are intercalated and deintercalated due to repeated charging and discharging, resulting in serious "volume" expansion (300% or more) and shrinkage. As a result, cracks in the silicon-based negative electrode active material destroy the SEI film formed on the surface of the negative electrode. As the surface of the silicon-based negative electrode active material is continuously exposed to the electrolyte solution, the consumption of the lithium ion source intensifies. In addition, such a side reaction generates a thick and unstable film at the interface between the silicon and the electrolyte solution, and there is a limit to commercialization.

In order to solve the above problems, the present disclosure aims to provide a non-aqueous electrolyte solution for a lithium secondary battery, which may form a robust SEI on the silicon-based negative electrode by improving the composition of additives included in the electrolyte solution, and a lithium secondary battery in which the high-rate charge and discharge at high temperatures are improved by using the same.

Non-Aqueous Electrolyte Solution for Lithium Secondary Battery

Specifically, in an embodiment of the present disclosure, provided a non-aqueous electrolyte solution for a lithium secondary battery which includes a lithium salt, a non-aqueous organic solvent, and a first additive, wherein a compound represented by the following Formula 1 is included as the first additive.

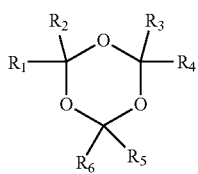

[Formula 1]

In Formula 1, $R_1$ to $R_6$ are each independently hydrogen, an alkyl group having to 5 carbon atoms, or —(R')n-C≡CH, R' is an alkylene group having 1 to 5 carbon atoms, n is an integer of 0 to 3, and at least one of $R_1$ to $R_6$ is —(R')n-C≡CH.

(1) Lithium Salt

First, in the non-aqueous electrolyte solution for a lithium secondary battery of the present disclosure, any lithium salt typically used in an electrolyte solution for a lithium secondary battery may be used as the lithium salt without limitation, and, for example, the lithium salt may include may include $Li^+$ as a cation, and may include at least one selected from $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7O_3^-$ or $SCN^-$ as an anion.

Specifically, the lithium salt may include a single material selected from LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (Lithium bis(fluorosulfonyl)imide, LiFSI), $LiN(SO_2CF_2CF_3)_2$ (Lithium bis(pentafluoroethanesulfonyl)imide, LiBETI) or LiN$(SO_2CF_3)_2$ (Lithium bis(trifluoromethane sulfonyl)imide, LiTFSI) or a mixture of two or more thereof. Specifically, the lithium salt may include at least one selected from $LiBF_4$, $LiPF_6$, $LiN(SO_2F)_2$ (Lithium bis(fluorosulfonyl)imide, LiFSI), $LiN(SO_2CF_2CF_3)_2$ (Lithium bis(pentafluoroethanesulfonyl)imide, LiBETI) or $LiN(SO_2CF_3)_2$ (Lithium bis(trifluoromethane sulfonyl)imide, LiTFSI). In addition to them, any lithium salt commonly used in an electrolyte solution of a lithium secondary battery may be used without limitation.

The lithium salt may be appropriately changed in a normally usable range, but may be included in a concentration of 0.8 M to 3.0 M, specifically, 1.0 M to 2.0 M, and preferably 1.0 M to 1.8 M in the electrolyte solution to obtain an optimum effect of forming a film for preventing corrosion of an electrode surface.

When the concentration of the lithium salt is in the above range, the viscosity of the non-aqueous electrolyte solution may be controlled to achieve the optimal impregnability, and the effects of improving the capacity and cycle characteristics of a lithium secondary battery may be obtained by improving the mobility of lithium ions.

(2) Non-Aqueous Organic Solvent

Further, the non-aqueous organic solvent will be described.

Various non-aqueous organic solvents typically used in a non-aqueous electrolyte solution may be used as the non-aqueous organic solvent without limitation. The non-aqueous organic solvent is not limited as long as it may minimize decomposition due to an oxidation reaction during charge and discharge of the secondary battery and may exhibit desired characteristics with the additive.

Specifically, the non-aqueous organic solvent may include (i) a cyclic carbonate-based organic solvent, (ii) a linear carbonate-based organic solvent, or (iii) a mixed organic solvent thereof.

The (i) cyclic carbonate-based organic solvent is a highly viscous organic solvent, which may well dissociate the lithium salt in a non-aqueous electrolyte solution due to the high permittivity, wherein specific examples thereof may be at least one organic solvent selected from ethylene carbonate (EC), propylene carbonate (PC), fluoroethylene carbonate (FEC), 1,2-butylene carbonate, 2,3-butylene carbonate, 1,2-pentylene carbonate, 2,3-pentylene carbonate, or vinylene carbonate, and may include at least one from ethylene carbonate (EC), propylene carbonate (PC), or fluoroethylene carbonate (FEC) capable of forming a more stable SEI on the Si negative electrode surface among them.

The (ii) linear carbonate-based organic solvent is an organic solvent having low viscosity and low permittivity, wherein typical examples thereof may be at least one organic solvent selected from dimethyl carbonate (DMC), diethyl carbonate (DEC), dipropyl carbonate, ethyl methyl carbonate (EMC), methylpropyl carbonate, or ethylpropyl carbonate, and specially may include at least one of dimethyl carbonate, ethyl methyl carbonate, or diethyl carbonate.

Also, the non-aqueous organic solvent may include a mixture of the (i) cyclic carbonate-based organic solvent and the (ii) linear carbonate-based organic solvent in a mixing ratio of 10:90 to 50:50 by volume, and specifically 20:80 to 40:60 by volume to secure the high ionic conductivity of the non-aqueous electrolyte solution.

Furthermore, the non-aqueous organic solvent may further include at least one organic solvent of (iv) a linear ester-based organic solvent or (v) a cyclic ester-based organic solvent, which have lower melting point and higher storage stability at high temperatures compared to the cyclic carbonate-based organic solvent and/or the linear carbonate-based organic solvent, to prepare an electrolyte solution having high ionic conductivity.

Specific examples of the (iv) linear ester-based organic solvent may be at least one organic solvent selected from methyl acetate, ethyl acetate, propyl acetate, methyl propionate, ethyl propionate, propyl propionate, or butyl propionate, wherein specific examples thereof may include at least one of ethyl propionate or propyl propionate.

Also, the (iv) cyclic ester-based organic solvent may include at least one organic solvent selected from γ-butyrolactone, γ-valerolactone, γ-caprolactone, σ-valerolactone, or ε-caprolactone.

The non-aqueous organic solvent may be used by adding an organic solvent typically used in an electrolyte solution for a lithium secondary battery without limitation, if necessary. For example, the non-aqueous organic solvent may further include at least one organic solvent selected from an ether-based organic solvent, an amide-based organic solvent, or a nitrile-based organic solvent.

In the non-aqueous electrolyte solution of the present disclosure, a remainder except for the lithium salt, first additive, and other additives may include non-aqueous organic solvents unless otherwise stated.

(3) First Additive

The non-aqueous electrolyte solution for a lithium secondary battery of the present disclosure may include a compound represented by the following Formula 1 as a first additive.

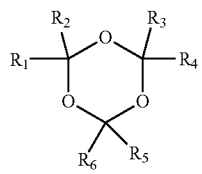

[Formula 1]

In Formula 1,
$R_1$ to $R_6$ are each independently hydrogen, an alkyl group having 1 to 5 carbon atoms, or —(R')n-C≡CH, R' is an alkylene group having 1 to 5 carbon atoms, n is an integer of 0 to 3, and at least one of $R_1$ to $R_6$ is —(R')n-C≡CH.

A compound represented by Formula 1 added as the first additive contains a propargyl group capable of forming a robust SEI in the structure and a trioxane functional group with excellent elasticity and lithium ion transportability, and may form a polyoxymethylene (POM) polymer structure and a stable SEI with ether group-based elasticity on the surface of the silicon-based negative electrode, while being reduced and decomposed before the organic solvent during charge and discharge. This enables to suppress the SEI cracking due to the shrinkage/expansion of the silicon-based negative electrode active material. In particular, since the SEI based on the polyoxymethylene polymer structure and ether group is thermally stable, the high-temperature durability of lithium secondary batteries, such as cycle characteristics and capacity characteristics may be improved by preventing side reactions caused by direct contact between the lithium ions stored in the silicon-based negative electrode at high temperatures and the electrolyte solution.

Specifically, in Formula 1, $R_1$ to $R_6$ are each independently hydrogen, an alkyl group having 1 to 3 carbon atoms, or —(R')n-C≡CH, R' is an alkylene group having 1 to 3 carbon atoms, n is an integer of 0 to 3, and at least one of $R_1$ to $R_6$ is —(R')n-C≡CH.

Further, in Formula 1, $R_1$, $R_3$ and $R_5$ are each independently hydrogen or an alkyl group having 1 to 3 carbon atoms, $R_2$, $R_4$ and $R_6$ are each independently an alkyl group having 1 to 3 carbon atoms or —(R')n-C≡CH, R' is an alkylene group having 1 to 3 carbon atoms, n is an integer of 0 to 3, and at least one of $R_2$, $R_4$ or $R_6$ is —(R')n-C≡CH.

Further, in Formula 1, $R_1$, $R_3$ and $R_5$ are each independently hydrogen or an alkyl group having 1 to 3 carbon atoms, $R_2$, $R_4$ and $R_6$ are each independently —(R')n-C≡CH, R' is an alkylene group having 1 to 3 carbon atoms, and n is an integer of 0 to 3.

Specifically, the compound represented by Formula 1 may be at least one of compounds represented by the following Formula 1A-1 to Formula 1A-3. Preferably, the compound represented by Formula 1 may be a compound represented by Formula 1A-1 or Formula 1A-3, in which the propargyl groups having excellent film-forming effects relatively more substituted when compared to the compound represented by Formula 1A-2, more preferably, may be a compound represented by Formula 1A-1 in which the propargyl groups are substituted the most.

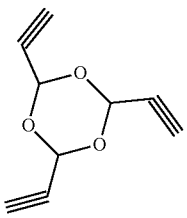

[Formula 1A-1]

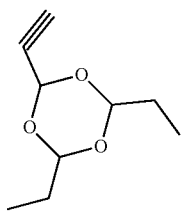

[Formula 1A-2]

[Formula 1A-3]

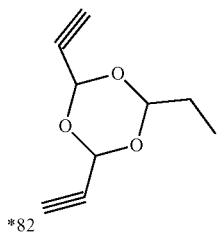

*82

The compound represented by Formula 1 may be included in an amount of 0.1 wt % to 10.0 wt % based on the total weight of the non-aqueous electrolyte solution.

When the compound represented by Formula 1 is included in the above range, it is possible to effectively prevent the deterioration of the negative electrode during rapid charge and discharge by forming a robust film on the surface of the silicon-based negative electrode while preventing side reactions caused by excessive additives, and thus secondary batteries with improved overall performance may be manufactured.

Specifically, when the content of the compound represented by Formula 1 is 0.1 wt % or more, it may stably maintain the effect of forming a film on the surface of the negative electrode during battery operation time. When the content of the compound represented by Formula 1 is 10.0 wt % or less, it is possible to control the viscosity of the non-aqueous electrolyte solution so as to realize optimal impregnability, to effectively suppress an increase in the battery resistance due to decomposition of additives, and to prevent degradation of rate characteristics or low-temperature life characteristics by not reducing the ionic conductivity of the electrolyte.

More specifically, the compound represented by Formula 1 may be included in an amount of 0.1 wt % to 7.0 wt %, more preferably in an amount of 0.1 wt % to 5.0 wt %.

(4) Second Additive

Furthermore, in order to prevent a non-aqueous electrolyte solution from being decomposed to cause collapse of the negative electrode in a high output environment, or further improve low-temperature high-rate discharge characteristics, high-temperature stability, overcharge protection, and an effect of suppressing battery swelling at high temperatures, the non-aqueous electrolyte solution for a lithium secondary battery of the present disclosure may further include second additives in the non-aqueous electrolyte solution, if necessary.

As typical examples, the second additive may include at least one second additive selected from a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, or a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from 1,3-propane sultone (PS), 1,4-butane sultone, ethene sultone, 1,3-propene sultone (PRS), 1,4-butene sultone, or 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from lithium difluoro bis(oxalato)phosphate, lithium difluoro phosphate, tris(trimethylsilyl) phosphate, tris(2,2,2-trifluoroethyl)phosphate, or tris(trifluoroethyl)phosphate.

The borate-based compound may include tetraphenyl borate or lithium oxalyldifluoroborate.

The nitrile-based compound may include at least one compound selected from succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, or 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt compound may include at least one compound selected from $LiPO_2F_2$, LiODFB, LiBOB (Lithium bis(oxalato)borate ($LiB(C_2O_4)_2$), or $LiBF_4$.

In the case in which, among these second additives, vinylene carbonate, vinyl ethylene carbonate, or succinonitrile is included, a more robust SEI may be formed on the surface of the negative electrode during an initial activation process of the secondary battery.

Two or more of the second additives may be mixed and used, and the second additives may be included in an amount of 50 wt % or less, specifically 0.01 wt % to 10 wt %, and preferably 0.05 wt % to 5 wt % based on the total weight of the non-aqueous electrolyte solution. In a case in which the content of the second additives is 0.01 wt % or less, an effect of improving low-temperature output, high-temperature storage characteristics, and high-temperature life characteristics is insignificant, and when the content of the second additives is greater than 50 wt %, a side reaction in the electrolyte solution may excessively occur during charge and discharge of the battery. Particularly, if the excessive amount of the additives for forming an SEI is added, the additives may not be sufficiently decomposed at high temperatures so that the additives may be present in the form of an unreacted material or precipitates in the electrolyte solution at room temperature. Accordingly, a side reaction may occur in which lifetime or resistance characteristics of the secondary battery are degraded.

Lithium Secondary Battery

Also, in another embodiment of the present disclosure, the present disclosure provides a lithium secondary battery including the non-aqueous electrolyte solution for a lithium secondary battery of the present disclosure.

After an electrode assembly, in which the positive electrode, the negative electrode, and the separator between the positive electrode and the negative electrode are sequentially stacked, is formed and accommodated in a battery case, the lithium secondary battery of the present disclosure may be prepared by injecting the non-aqueous electrolyte solution of the present disclosure thereto.

The lithium secondary battery of the present disclosure may be prepared according to a conventional method known in the art and used, and a method of preparing the lithium secondary battery of the present disclosure is specifically the same as that described later.

(1) Positive Electrode

The positive electrode according to the present disclosure may include a positive electrode active material layer comprising a positive electrode active material, and, if necessary, the positive electrode active material layer may further include a conductive agent and/or a binder.

The positive electrode active material is a compound capable of reversibly intercalating and deintercalating lithium, and specifically may include a lithium composite metal oxide represented by the following Formula 2 including at least one metal selected from nickel (Ni), cobalt (Co), manganese (Mn), iron (Fe) or aluminum (Al) and lithium.

[Formula 2]

In Formula 2, $M^1$ is Mn, Al or a combination thereof, $M^2$ is at least one selected from Al, Zr, W, Ti, Mg, Ca or Sr, wherein $0 \leq a \leq 0.5$, $0.55 < x < 1.0$, $0 < y \leq 0.4$, $0 < z \leq 0.4$, $0 \leq w \leq 0.1$.

$1+a$ represents an atomic fraction of the lithium in a lithium transition metal oxide, and may be $0 \leq a \leq 0.5$, preferably $0 \leq a \leq 0.2$, and more preferably $0 \leq a \leq 0.1$.

x represents an atomic fraction of nickel among all transition metal elements in the lithium transition metal oxide, and may be $0.55 < x < 1.0$, specifically $0.6 \leq x \leq 0.98$, and more specifically $0.6 \leq x \leq 0.95$.

y represents an atomic fraction of cobalt among all transition metal elements in the lithium transition metal oxide, and may be $0 < y \leq 0.4$, specifically $0 < y \leq 0.3$, and more specifically $0.05 \leq y \leq 0.3$.

z represents an atomic fraction of the element $M^1$ among all transition metal elements in the lithium transition metal oxide, and may be $0 < z \leq 0.4$, preferably $0 < z \leq 0.3$, and more preferably $0.01 \leq z \leq 0.3$.

w represents an atomic fraction of the element $M^2$ among all transition metal elements in the lithium transition metal oxide, and may be $0 < w \leq 0.1$, preferably $0 < w \leq 0.05$, and more preferably $0 < w \leq 0.02$.

Specifically, the positive electrode active material may include a lithium composite transition metal oxide such as $Li(Ni_{0.6}Mn_{0.2}Co_{0.2})O_2$, $Li(Ni_{0.7}Mn_{0.15}Co_{0.15})O_2$, $Li(Ni_{0.7}Mn_{0.2}Co_{0.1})O_2$, $Li(Ni_{0.8}Mn_{0.1}Co_{0.1})O_2$, $Li(Ni_{0.8}Co_{0.15}Al_{0.05})O_2$, $Li(Ni_{0.86}Mn_{0.07}Co_{0.05}Al_{0.02})O_2$ or $Li(Ni_{0.90}Mn_{0.05}Co_{0.05})O_2$ having a Ni content of 0.55 atm % or more to achieve a high capacity battery, and specifically may include a high Ni-based lithium composite transition metal oxide such as $Li(Ni_{0.8}Mn_{0.1}Co_{0.1})O_2$, $Li(Ni_{0.8}Co_{0.15}Al_{0.05})O_2$, $Li(Ni_{0.86}Mn_{0.07}Co_{0.05}Al_{0.02})O_2$ or $Li(Ni_{0.90}Mn_{0.05}Co_{0.05})O_2$.

The positive electrode active material including a high-Ni-based lithium composite transition metal oxide has the disadvantage of being vulnerable to side reactions with the electrolyte solution. However, as the electrolyte solution of the present disclosure is used together, a stable passivation film is formed on the surface of the positive electrode, thereby suppressing and reducing side reactions with the electrolyte solution.

Further, as the positive electrode active material of the present disclosure, a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-z}Ni_zO_4$ (where $0<Z<2$)), a lithium-nickel-cobalt-based oxide (e.g., $LiNi_{1-Y1}Co_{Y1}O_2$ (where $0<Y1<1$)), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z1<2$)), or $Li(Ni_{p1}Co_{q1}Mn_{r2})O_4$ ($0<p1<2$, $0<q1<2$, $0<r2<2$, $p1+q1+r2=2$) may be used together with a lithium composite metal oxide represented by Formula 2 above.

The positive electrode active material may be present in an amount of 80 wt % to 98 wt %, more specifically, 85 wt % to 98 wt % based on the total weight of the positive electrode active material layer. Here, when the amount of the positive electrode active material is included in the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery. Specific examples of the conductive agent may be a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, or nickel powder; conductive whiskers such as zinc oxide whiskers or potassium titanate whiskers; conductive metal oxide such as titanium oxide; or polyphenylene derivatives, and any one thereof or a mixture of two or more thereof may be used.

The conductive agent may be included in an amount of 0.1 wt % to 10 wt %, preferably, 0.1 wt % to 5 wt % based on the total weight of the positive electrode active material layer.

Next, the binder improves the adhesion between positive electrode active material particles and the adhesion between the positive electrode active material and a current collector. As an example of the binder, any one of a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder or a mixture of two or more thereof may be used.

The binder may be included in an amount of 0.1 wt % to 15 wt %, preferably, 0.1 wt % to 10 wt % based on the total weight of the positive electrode active material layer.

The positive electrode of the present disclosure as described above may be prepared by a method of preparing a positive electrode which is known in the art. For example, the positive electrode may be prepared by a method in which a positive electrode current collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support and a film separated from the support is then laminated on the positive electrode current collector.

The positive electrode current collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode current collector may typically have a thickness of 3 μm to 500 μm, and microscopic irregularities may be formed on the surface of the collector to improve the adhesion of the positive electrode material. The positive electrode current collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if a positive electrode material mixture may be adjusted to have appropriate viscosity in consideration of a coating thickness of the positive electrode material mixture, manufacturing yield, and workability, and is not particularly limited.

(2) Negative Electrode

Next, a negative electrode will be described.

The negative electrode according to the present disclosure includes a negative electrode active material layer including a negative electrode active material, and the negative electrode active material layer may further include a conductive agent and/or a binder, if necessary.

As the negative electrode active material of the present disclosure, a silicon-based negative electrode active material may be used alone.

The silicon-based negative electrode active material, for example, may include at least one selected from metallic silicon (Si), silicon oxide ($SiO_x$, where $0<x<2$), silicon carbide (SiC), or a Si—Y alloy (where Y is an element selected from alkali metal, alkaline earth metal, a Group 13 element, a Group 14 element, transition metal, a rare earth element, and a combination thereof, and is not Si). The element Y may be selected from Mg, Ca, Sr, Ba, Ra, Sc, Y, Ti, Zr, Hf, Rf, V, Nb, Ta, Db (dubnium), Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Since the silicon-based negative electrode active material has higher capacity characteristics than the carbon-based negative electrode active material, superior capacity characteristics may be obtained. However, with respect to a negative electrode including the silicon-based negative electrode active material, it contains more oxygen (O)-rich components in the SEI than a graphite negative electrode, and thus the SEI containing the O-rich components tends to be more easily decomposed when a Lewis acid, such as HF or $PF_5$, is present in the electrolyte solution. Thus, with respect to the negative electrode containing the silicon-based negative electrode active material, there is a need to suppress the formation of the Lewis acid, such as HF and $PF_5$, in the electrolyte solution or remove (or scavenge) the formed Lewis acid in order to stably maintain the SEI. Since the non-aqueous electrolyte solution according to the present disclosure includes the electrolyte solution additive capable of forming a stable film on the surface of the silicon-based negative electrode, it may effectively suppress the decomposition of the SEI film when the negative electrode containing the silicon-based negative electrode active material is used.

The negative electrode may further include a common negative electrode active material capable of reversibly intercalating/deintercalating lithium ions, e.g., a carbon-based negative electrode active material, in addition to the silicon-based negative electrode active material.

As the carbon-based negative electrode active material, various carbon-based negative electrode active materials used in the art, for example, a graphite-based materials such as natural graphite, artificial graphite, or Kish graphite; pyrolytic carbon, mesophase pitch based carbon fiber, meso-carbon microbeads, mesophase pitches, high-temperature sintered carbon such as petroleum or coal tar pitch derived cokes, soft carbon, or hard carbon may be used. A shape of the carbon-based negative electrode active material is not particularly limited, and materials of various shapes, such as an irregular shape, planar shape, flaky shape, spherical shape, or fibrous shape, may be used.

Preferably, at least one of natural graphite or artificial graphite may be used as the carbon-based negative electrode active material, and the natural graphite and artificial graphite may be used together to suppress exfoliation of the active material by increasing adhesion with the current collector.

When the silicon-based negative electrode active material and the carbon-based negative electrode active material are used together, a mixing ratio thereof may be in a range of 3:97 to 99:1, preferably, 5:95 to 15:85, as a weight ratio. When the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on the total weight of the negative electrode active material layer. When the amount of the negative electrode active material satisfies the above range, excellent capacity characteristics and electrochemical properties may be obtained.

Next, the conductive agent is a component for further improving the conductivity of the negative electrode active material and may be added in an amount of 10 wt % or less, preferably, 5 wt % or less based on the total weight of the negative electrode active material layer. The conductive agent is not particularly limited as long as it has conductivity without causing adverse chemical changes in the battery. For example, a conductive material such as carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, or nickel powder; conductive whiskers such as zinc oxide whiskers or potassium titanate whiskers; conductive metal oxide such as titanium oxide; or polyphenylene derivatives, may be used.

The binder is a component that assists in the binding between the conductive agent, the active material, and the current collector, and may be commonly included in an amount of 0.1 wt % to 10 wt based on the total weight of the negative electrode active material layer. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; or a silane-based binder.

The binder may be commonly included in an amount of 0.1 wt % to 15 wt %, preferably 0.1 wt % to 10 wt % based on a total weight of the negative electrode active material layer.

The negative electrode may be prepared by a method of preparing a negative electrode which is known in the art. For example, the negative electrode may be prepared by a method in which a negative electrode current collector is coated with a negative electrode slurry, which is prepared by dissolving or dispersing the negative electrode active material as well as optionally the binder and the conductive agent in a solvent, rolled and dried, or may be prepared by casting the negative electrode slurry on a separate support and then laminating a film separated from the support on the negative electrode current collector.

The negative electrode current collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, or an aluminum-cadmium alloy may be used. The negative electrode current collector may typically have a thickness of 3 µm to 500 µm, and, similar to the positive electrode current collector, microscopic irregularities may be formed on the surface of the current collector to improve the adhesion of the negative electrode active material. The negative electrode current collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present disclosure includes a separator between the positive electrode and the negative electrode.

As the separator separates the negative electrode and the positive electrode and provides a movement path of lithium ions, wherein any separator may be used without particular limitation as long as it is typically used as the separator in a lithium secondary battery. Particularly, a separator having a high moisture retention ability for an electrolyte solution as well as low resistance to the ion transfer of lithium salts may be desirable.

Specifically, as the separator, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure of two layers or more of these may be used. Also, a typical porous nonwoven fabric, for example, a nonwoven fabric comprised of high melting point glass fibers or polyethylene terephthalate fibers may be used. In addition, a coated separator containing a ceramic component or a polymer material may be used to secure heat resistance or mechanical strength; and optionally, it can be used as a single layer or multi-layered structure.

The lithium secondary battery according to the present disclosure as described above may be suitably used in portable devices, such as mobile phones, notebook computers, and digital cameras, and electric cars such as hybrid electric vehicles (HEVs).

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be preferably used as a unit cell in a medium and large sized battery module including a plurality of battery cells.

Hereinafter, the present disclosure will be described in more detail according to examples. However, the invention may be embodied in many different forms and should not be construed as being limited to the embodiments set forth herein. Rather, these example embodiments are provided so that this description will be thorough and complete, and will fully convey the scope of the present disclosure to those skilled in the art.

EXAMPLES

Example 1

(Non-Aqueous Electrolyte Solution Preparation)

After $LiPF_6$ was dissolved in a non-aqueous organic solvent, in which fluoroethylene carbonate (FEC) and diethyl carbonate (DEC) were mixed in a volume ratio of 10:90, such that a concentration of the $LiPF_6$ was 1.5 M, a non-aqueous electrolyte solution for a lithium secondary battery was prepared by adding 0.1 wt % of the compound represented by Formula 1A-1 and 0.5 wt % of vinylene carbonate (VC), and 0.5 wt % of 1,3-propane sultone (PS) (see Table 1 below).

(Secondary Battery Preparation)

A lithium nickel-manganese-cobalt-aluminum oxide (Li$(Ni_{0.86}Mn_{0.07}Co_{0.05}Al_{0.02})O_2$) as a positive electrode active material particle, carbon black as a conductive agent, and (polyvinylidene fluoride as a binder were added to N-methyl-2-pyrrolidone (NMP), which is a solvent, in a weight ratio of 97.74:0.7:1.56 to prepare a positive electrode slurry (solid content: 75.50 wt %). The positive electrode slurry was applied and dried on an aluminum (Al) thin film having a thickness of 15 µm as a positive electrode current collector, and then roll pressing was performed thereon to prepare a positive electrode.

A silicon-based negative electrode active material (100% Si), a binder (SBR-CMC), and a conductive agent (carbon black) were added in a weight ratio of 70:20.3:9.7 to water, which is a solvent, to prepare a negative electrode slurry (solid content: 26 wt %). A negative electrode current collector (copper (Cu) thin film) with a thickness of 15 µm was coated with the negative electrode slurry, dried, and then roll-pressed to prepare a negative electrode.

After an electrode assembly was prepared by disposing a porous polypropylene separator between the prepared positive electrode and the negative electrode, the electrode assembly was accommodated in a battery case, and then the non-aqueous electrolyte solution for a lithium secondary battery of the present disclosure was injected thereto to prepare a lithium secondary battery.

Example 2

A lithium secondary battery was prepared in the same manner as in Example 1 except that $LiPF_G$ was dissolved in a non-aqueous organic solvent such that a concentration of the LiPF$_6$ was 1.5M, and a non-aqueous electrolyte solution was prepared by adding 1.0 wt % of the compound represented by Formula 1A-1, 0.5 wt % of vinylene carbonate (VC), and 0.5 wt % of 1,3-propanesultone (PS) (see Table 1 below).

Example 3

A lithium secondary battery was prepared in the same manner as in Example 1 except that LiPF$_F$ was dissolved in a non-aqueous organic solvent such that a concentration of the LiPF$_F$ was 1.5M, and a non-aqueous electrolyte solution was prepared by adding 5.0 wt % of the compound represented by Formula 1A-1, 0.5 wt % of vinylene carbonate (VC), and 0.5 wt % of 1,3-propanesultone (PS) (see Table 1 below).

Example 4

A lithium secondary battery was prepared in the same manner as in Example 1 except that LiPF$_G$ was dissolved in a non-aqueous organic solvent such that a concentration of the LiPF$_6$ was 1.5M, and a non-aqueous electrolyte solution was prepared by adding 10.0 wt % of the compound represented by Formula 1A-1, 0.5 wt % of vinylene carbonate (VC), and 0.5 wt % of 1,3-propanesultone (PS) (see Table 1 below).

Example 5

A lithium secondary battery was prepared in the same manner as in Example 1 except that LiPF$_F$ was dissolved in a non-aqueous organic solvent such that a concentration of the LiPF$_6$ was 1.5M, and a non-aqueous electrolyte solution was prepared by adding 11.0 wt % of the compound represented by Formula 1A-1, 0.5 wt % of vinylene carbonate (VC), and 0.5 wt % of 1,3-propanesultone (PS) (see Table 1 below).

Example 6

A lithium secondary battery was prepared in the same manner as in Example 2 except that a non-aqueous electrolyte solution was prepared by adding the compound represented by Formula 1A-2 instead of the compound represented by Formula 1A-1 (see Table 1 below).

Example 7

A lithium secondary battery was prepared in the same manner as in Example 2 except that a non-aqueous electrolyte solution was prepared by adding the compound represented by Formula 1A-3 instead of the compound represented by Formula 1A-1 (see Table 1 below).

Comparative Example 1

A lithium secondary battery was prepared in the same manner as in Example 1 except that LiPF$_G$ was dissolved in a non-aqueous organic solvent such that a concentration of the LiPF$_6$ was 1.5M, and a non-aqueous electrolyte solution was prepared by adding 0.5 wt % of vinylene carbonate (VC) and 0.5 wt % of 1,3-propanesultone (PS) as additives (see Table 1 below).

Comparative Example 2

A lithium secondary battery was prepared in the same manner as in Example 1 except that a non-aqueous electrolyte solution was prepared by adding 0.5 wt % of the compound represented by the following Formula 3 instead of the compound represented by Formula 1A-1 as an additive (see Table 1 below).

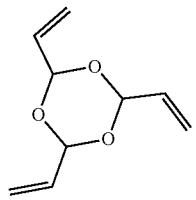

[Formula 3]

Comparative Example 3

A lithium secondary battery was prepared in the same manner as in Example 1 except that a non-aqueous electrolyte solution was prepared by adding 0.5 wt % of the compound represented by the following Formula 4 instead of the compound represented by Formula 1A-1 as an additive (see Table 1 below).

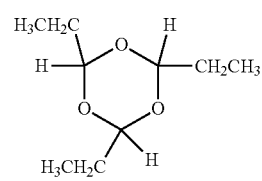

[Formula 4]

TABLE 1

| | Non-aqueous organic solvent | Additive Type | Content (wt %) | Other additives Type | Content (wt %) |
|---|---|---|---|---|---|
| Example 1 | FEC:DEC = 10:90 volume ratio | Formula 1A-1 | 0.1 | VC/PS | 0.5/0.5 |
| Example 2 | | Formula 1A-1 | 1.0 | | |
| Example 3 | | Formula 1A-1 | 5.0 | | |
| Example 4 | | Formula 1A-1 | 10.0 | | |
| Example 5 | | Formula 1A-1 | 11.0 | | |
| Example 6 | | Formula 1A-2 | 1.0 | | |
| Example 7 | | Formula 1A-3 | 1.0 | | |
| Comparative Example 1 | | — | — | | |
| Comparative Example 2 | | Formula 3 | 0.5 | | |
| Comparative Example 3 | | Formula 4 | 0.5 | | |

EXPERIMENTAL EXAMPLES

Experimental Example 1. High-Temperature Cycle Characteristics Evaluation

Each of the lithium secondary batteries prepared in Examples 1 to 7 and Comparative Examples 1 to 3 was evaluated for the high-temperature cycle characteristics.

Specifically, the lithium secondary batteries prepared in Examples 1 to 7 and the lithium secondary batteries prepared in Comparative Examples 1 to 3 were respectively charged at a 1 C rate to 4.2V under a constant current condition at 40° C. and were discharged at a 0.5 C rate to 3.0V under a constant current condition which were set up as one cycle. The capacity retention (%) based on the initial capacity was measured after 200 cycles of the charge and discharge process, and the results are presented in Table 2 below.

TABLE 2

|  | Capacity retention (%) |
|---|---|
| Example 1 | 78.5 |
| Example 2 | 80.8 |
| Example 3 | 81.2 |
| Example 4 | 82.5 |
| Example 5 | 79.0 |
| Example 6 | 78.9 |
| Example 7 | 80.3 |
| Comparative Example 1 | 74.8 |
| Comparative Example 2 | 76.1 |
| Comparative Example 3 | 75.7 |

Referring to Table 2 above, it was confirmed that with respect to the lithium secondary batteries of Examples 1 to 7 including the non-aqueous electrolyte solution comprising the additive of the present disclosure, the capacity retention (%) was relatively improved compared to the lithium secondary batteries of Comparative Examples 1 to 3, wherein the additive was not included.

Through these results, it was confirmed that when the additive of the present disclosure was used, a robust SEI film due to the propargyl group and a polymeric ether group-based film having a strong elasticity and capable of transferring lithium ions due to the trioxane functional group were formed on the negative electrode, thereby improving the capacity retention rate at high temperatures.

Experimental Example 2. High-Temperature Storage Characteristics Evaluation

High-temperature storage characteristics for each of the lithium secondary batteries prepared in Examples 1 to 7 and the lithium secondary batteries prepared in Comparative Examples 1 to 3 were evaluated.

Specifically, the lithium secondary batteries prepared in Examples 1 to 7 and the lithium secondary batteries prepared in Comparative Examples 1 to 3 were fully charged to 4.2V and were stored at 60° C. for 8 weeks.

Before the storage, the capacity of the initial secondary battery was set by measuring the capacity of the fully charged secondary battery.

After 8 weeks, the capacity of the stored secondary battery was measured to calculate the reduced capacity during the 8-week storage period. The capacity retention rate after 8 weeks was derived by calculating the ratio of the reduced capacity to the capacity of the initial secondary battery as a percentage. The results are presented in Table 3 below.

TABLE 3

|  | Capacity retention (%) |
|---|---|
| Example 1 | 90.1 |
| Example 2 | 91.5 |
| Example 3 | 94.3 |
| Example 4 | 95.7 |
| Example 5 | 89.4 |
| Example 6 | 90.8 |
| Example 7 | 91.4 |
| Comparative Example 1 | 85.6 |
| Comparative Example 2 | 87.9 |
| Comparative Example 3 | 87.1 |

Referring to Table 3, it can be seen that the secondary batteries of Examples 1 to 7 comprising the electrolyte solution including the additive of the present disclosure have the improved capacity retention rates after the storage at high temperatures compared to the secondary batteries of Comparative Examples 1 to 3.

The invention claimed is:

1. A non-aqueous electrolyte solution for a lithium secondary battery, the non-aqueous electrolyte solution comprising a lithium salt, an organic solvent and a first additive, wherein the first additive is a compound represented by Formula 1:

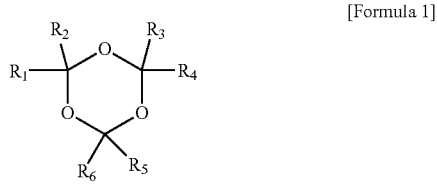

[Formula 1]

wherein in Formula 1, $R_1$ to $R_6$ are each independently hydrogen, an alkyl group having 1 to 5 carbon atoms, or —(R')n-C≡CH, R' is an alkylene group having 1 to 5 carbon atoms, n is an integer of 0 to 3, and at least one of $R_1$ to $R_6$ is —(R')n-C≡CH.

2. The non-aqueous electrolyte solution according to claim 1, wherein $R_1$ to $R_6$ are each independently hydrogen, an alkyl group having 1 to 3 carbon atoms, or —(R')n-C≡CH, R' is an alkylene group having 1 to 3 carbon atoms, n is an integer of 0 to 3, and at least one of $R_1$ to $R_6$ is —(R')n-C≡CH.

3. The non-aqueous electrolyte solution according to claim 1, wherein $R_1$, $R_3$ and $R_5$ are each independently hydrogen or an alkyl group having 1 to 3 carbon atoms, $R_2$, $R_4$ and $R_6$ are each independently an alkyl group having 1 to 3 carbon atoms or —(R')n-C≡CH, R' is an alkylene group having 1 to 3 carbon atoms, n is an integer of 0 to 3, and at least one of $R_2$, $R_4$ or $R_6$ is —(R')n-C≡CH.

4. The non-aqueous electrolyte solution according to claim 1, wherein $R_1$, $R_3$ and $R_5$ are each independently hydrogen or an alkyl group having 1 to 3 carbon atoms, $R_2$, $R_4$ and $R_6$ are —(R')n-C≡CH, R' is an alkylene group having 1 to 3 carbon atoms, and n is an integer of 0 to 3.

5. The non-aqueous electrolyte solution according to claim 1, wherein the first additive is a compound represented by Formula 1A-1, Formula 1A-2, or Formula 1A-3:

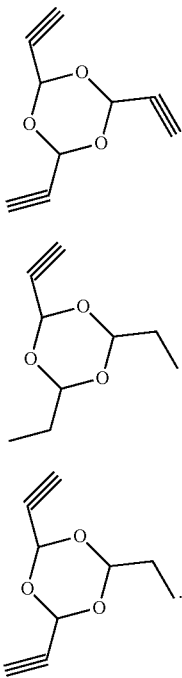

[Formula 1A-1]

[Formula 1A-2]

[Formula 1A-3]

6. The non-aqueous electrolyte solution according to claim 5, wherein the first additive is a compound represented by Formula 1A-1.

7. The non-aqueous electrolyte solution according to claim 1, wherein the first additive is included in an amount of 0.1 wt % to 10.0 wt % based on a total weight of the non-aqueous electrolyte solution.

8. The non-aqueous electrolyte solution according to claim 1, further comprising at least one second additive selected from a cyclic carbonate-based compound, a halogen-substituted carbonate-based compound, a sultone-based compound, a sulfate-based compound, a phosphate-based compound, a borate-based compound, a nitrile-based compound, an amine-based compound, a silane-based compound, or a lithium salt-based compound.

9. A lithium secondary battery comprising:
a positive electrode comprising a positive electrode active material;
a negative electrode comprising a negative electrode active material;
a separator disposed between the negative electrode and the positive electrode; and
the non-aqueous electrolyte solution according to claim 1.

10. The lithium secondary battery according to claim 9, wherein the negative electrode active material comprises a silicon-based negative electrode active material.

11. The lithium secondary battery according to claim 10, wherein the negative electrode active material further comprises a carbon-based negative electrode active material.

12. The non-aqueous electrolyte solution according to claim 1, wherein the lithium salt comprises at least one of $LiBF_4$, $LiPF_6$, $LiN(SO_2F)_2$, $LiN(SO_2CF_2CF_3)_2$ or $LiN(SO_2CF_3)_2$.

13. The non-aqueous electrolyte solution according to claim 1, wherein the organic solvent comprises a cyclic carbonate-based organic solvent, a linear carbonate-based organic solvent, or a mixture thereof.

14. The lithium secondary battery according to claim 9, wherein the positive electrode active material comprises a lithium composite transition metal oxide having a Ni content of 0.55 atm % or more.

15. The lithium secondary battery according to claim 9, wherein the positive electrode active material comprises $Li(Ni_{0.6}Mn_{0.2}Co_{0.2})O_2$, $Li(Ni_{0.7}Mn_{0.15}Co_{0.15})O_2$, $Li(Ni_{0.7}Mn_{0.2}Co_{0.1})O_2$, $Li(Ni_{0.5}Mn_{0.1}Co_{0.1})_2$, $Li(Ni_{0.5}Co_{0.15}Al_{0.05})O_2$, $Li(Ni_{0.56}Mn_{0.07}Co_{0.05}Al_{0.02})O_2$ or $Li(Ni_{0.90}Mn_{0.05}Co_{0.05})O_2$.

16. The lithium secondary battery according to claim 10, wherein the silicon-based negative electrode active material comprises at least one of Si; $SiO_x$, where 0<x<2; SiC; or a Si—Y alloy, where Y is one of an alkali metal, an alkaline earth metal, a Group 13 element, a Group 14 element, a transition metal, a rare earth element, or a combination thereof, and is not Si.

* * * * *